(12) United States Patent
Cheng et al.

(10) Patent No.: US 9,234,803 B2
(45) Date of Patent: Jan. 12, 2016

(54) METHOD AND DEVICE FOR DETECTING WINDING TEMPERATURE, METHOD AND DEVICE FOR THERMAL PROTECTION OF A MOTOR

(75) Inventors: Aiming Cheng, Beijing (CN); Feng Wang, Beijing (CN); Wenping Wang, Beijing (CN)

(73) Assignee: Beijing Jingwei HiRain Technologies Co., Ltd., Beijing (CN)

( * ) Notice: Subject to any disclaimer, the term of this patent is extended or adjusted under 35 U.S.C. 154(b) by 645 days.

(21) Appl. No.: 13/579,716

(22) PCT Filed: Feb. 29, 2012

(86) PCT No.: PCT/CN2012/000258
§ 371 (c)(1),
(2), (4) Date: Aug. 17, 2012

(87) PCT Pub. No.: WO2012/122852
PCT Pub. Date: Sep. 20, 2012

(65) Prior Publication Data
US 2013/0110449 A1 May 2, 2013

(30) Foreign Application Priority Data
Mar. 17, 2011 (CN) .......................... 2011 1 0065315

(51) Int. Cl.
*G01K 7/00* (2006.01)
*G01K 1/12* (2006.01)
(Continued)

(52) U.S. Cl.
CPC *G01K 1/12* (2013.01); *G01K 7/427* (2013.01); *G06F 15/00* (2013.01); *H02H 6/005* (2013.01);
(Continued)

(58) Field of Classification Search
USPC .......................................................... 702/132
See application file for complete search history.

(56) References Cited

U.S. PATENT DOCUMENTS 4,879,497 A 11/1989 Meyer et al.
5,600,575 A * 2/1997 Anticole ....................... 702/132
(Continued)

FOREIGN PATENT DOCUMENTS

CN 86100951 10/1986
CN 2781631 5/2006
(Continued)

OTHER PUBLICATIONS

Extended European Search Report issued in European Patent Application No. 12745387.6 dated Nov. 12, 2014.
(Continued)

*Primary Examiner* — Paul D Lee
(74) *Attorney, Agent, or Firm* — Venable LLP; Robert Kinberg

(57) ABSTRACT

A method and device for detecting the temperature of a motor winding, a method and device for thermal protection of a motor are provided, the method for detecting the temperature of a motor winding includes: obtaining the temperature of the motor winding at a first time before a time step; calculating the temperature rise of the rotor equivalent body after the motor runs for the time step; then calculating the temperature of the motor winding after the motor runs for the time step by superposing the temperature rise of the rotor equivalent body after the motor runs for the time step on the temperature of the motor winding obtained at the first time. By the method for detecting the temperature of a motor winding, the real-time monitoring on the temperature of the winding is achieved, thus applying the ability of the motor and improving sensitivity.

7 Claims, 5 Drawing Sheets

(51) Int. Cl.
*H02H 6/00* (2006.01)
*G06F 15/00* (2006.01)
*G01K 7/42* (2006.01)
H02P 23/14 (2006.01)
H02P 6/00 (2006.01)
H02P 29/00 (2006.01)
H02H 7/08 (2006.01)

(52) U.S. Cl.
CPC .............. *G01K 2205/00* (2013.01); *H02H 7/08* (2013.01); *H02P 6/001* (2013.01); *H02P 23/14* (2013.01); *H02P 29/0055* (2013.01)

(56) References Cited

U.S. PATENT DOCUMENTS

| | | | |
|---|---|---|---|
| 5,659,232 A | * | 8/1997 | Benning ....................... 318/438 |
| 7,692,399 B2 | | 4/2010 | Harriman et al. |
| 2006/0038539 A1 | * | 2/2006 | Swahn et al. .................... 322/24 |
| 2007/0153433 A1 | * | 7/2007 | Sundquist ....................... 361/25 |
| 2009/0189561 A1 | | 7/2009 | Patel et al. |

FOREIGN PATENT DOCUMENTS

| | | |
|---|---|---|
| CN | 101029915 | 9/2007 |
| CN | 101769797 A | 7/2010 |
| CN | 201548343 | 8/2010 |
| CN | 102156000 | 8/2011 |
| DE | 10053007 | 5/2001 |
| JP | 2011-015584 | 1/2011 |

OTHER PUBLICATIONS

Japanese International Search Report of PCT/CN2012/000258 Dated May 24, 2012.

* cited by examiner

METHOD AND DEVICE FOR DETECTING WINDING TEMPERATURE, METHOD AND DEVICE FOR THERMAL PROTECTION OF A MOTOR

FIELD OF THE INVENTION

The invention relates to a motor, and particularly to a method and device for detecting a motor winding temperature as well as a method and device for a thermal protection of a motor.

BACKGROUND OF THE INVENTION

When a motor operates, a part of electrical energy is converted into mechanical energy for being outputted, and a part of electrical energy is converted into heat energy to slowly spread to the air or other medium through materials of the motor structure. If the heat energy can not be transferred in time to the medium other than the motor, the temperature of the motor winding will rise, and when the temperature reaches a certain level, the motor is possible to burn out.

The common method for detecting the temperature of the motor winding is called as "over-current protection method", in which the running current of the motor is detected and when the running current reaches a specified value a specified action is executed for protecting the motor. Since the running current of the motor is not the only factor that causes heating and temperature rising of the motor winding and the growth speed of the temperature of the winding also relates to the thermal characteristic and load of the winding, the "over-current protection method" has shortcomings.

In addition, a more appropriate method is to embed a thermosensitive element in the dangerous heat source portion inside the motor to directly detect the temperature of heat source of the motor; and when the temperature exceeds the allowable value, actions related to the thermal protection of the motor will be started. This method has the advantage of accurately detecting temperature, but it needs to add an auxiliary device which has a high cost. Furthermore, for some small-sized motors, the installation of the thermosensitive element is too complex. In addition, the actual temperature of the dangerous heat source can not be detected unless the thermosensitive element sufficiently approximates to the dangerous heat source. However, for the motor, this is difficult to achieve.

SUMMARY OF THE INVENTION

An object of the invention is to provide a method for detecting the temperature of a motor winding to improve the detection accuracy on the temperature of the motor winding. In addition, the invention provides a device for detecting the temperature of a motor winding. Another object of the invention is to provide a method for thermal protection of a motor and a device for thermal protection of a motor. The object of the invention is also to provide a motor having a thermal protection device.

Therefore, according to an aspect of the invention, there is provided a method for detecting the temperature of a motor winding, including the following steps:

A) obtaining the temperature $T_{i-1}$ of the motor winding at a first time before a time step;

B) acquiring the equivalent thermal power $Q_W$ and the heat dissipation power $Q_{out}$ of the motor; and calculating, by using a first expression, the temperature rise $\Delta T$ of the rotor equivalent body after the motor runs for the time step $\Delta t$;

C) calculating, by using a second expression, the temperature $T_i$ of the motor winding after the motor runs for the time step $\Delta t$;

wherein, the first expression is:

$$\Delta T = \frac{(Q_w - Q_{out})\Delta t}{CM},$$

where C is the equivalent specific heat capacity of the motor rotor, M the mass of the motor rotor; and the second expression is: $T_i = T_{i-1} + \Delta T$.

According to another aspect of the invention, a method for thermal protection of a motor is provided, which includes:

According to the step A, the step B and the step C in the method for detecting the temperature of a motor winding described above, comparing the temperature of the motor winding obtained in step C with a temperature threshold, starting the thermal protection for the motor if the motor winding temperature is greater than the temperature threshold, otherwise, allowing the motor to continue working.

According to another aspect of the invention, a device for detecting the temperature of a motor winding is provided, which includes:

a motor winding temperature recorder configured to obtain the temperature $T_{i-1}$ of the motor winding at a first time before a time step $\Delta t$;

a motor winding temperature calculating unit configured to acquire the equivalent thermal power $Q_W$ and the heat dissipation power $Q_{out}$ of the motor; calculate, by using a first expression, the temperature rise $\Delta T$ of the rotor equivalent body after the motor runs for the time step $\Delta t$; and calculate, by using a second expression, the temperature $T_i$ of the motor winding after the motor runs for the time step $\Delta t$;

wherein the first expression is:

$$\Delta T = \frac{(Q_w - Q_{out})\Delta t}{CM},$$

where C is the equivalent specific heat capacity of the motor rotor, M the mass of the motor rotor;

the second expression is: $T_i = T_{i-1} + \Delta T$.

According to yet another aspect of the invention, a device for thermal protection of a motor winding is provided, which includes: the device for detecting the temperature of the motor winding described above configured to detect the temperature of the motor winding at the current moment; and a thermal protection controller configured to compare the temperature of the motor winding detected by the device for detecting the temperature of the motor winding at the current moment with a temperature threshold, start the thermal protection for the motor if the temperature of the motor winding is greater than the temperature threshold, otherwise, allow the motor to continue working.

The invention also provides a motor including the device for thermal protection of a motor winding described above.

Compared with the prior art, in the invention, the temperature of the motor winding is detected by using an iterative calculation process for the temperature, which fully reflects the temperature rising effect caused by heat accumulation of the motor rotor equivalent body, thus achieving the real-time monitoring on temperature.

In the method for the thermal protection of a motor according to the invention, the starting of the thermal protection is based on the allowable temperature of the winding. In the case of the cold state over-current, thermal state over-current and frequent over-current, the temperature of the winding is used as the action condition, thus implementing the capability of the motor and improving sensitivity.

Furthermore, in the invention, the motor equivalent thermal resistance is introduced, which reflects directly the heat transfer characteristics of the motor and the impact of the ambient temperature on the temperature of the winding. The equivalent specific heat capacity is also introduced, which can reflect the relationship between the ability of the rotor to hold heat and the ability of the motor to dissipate heat.

Furthermore, in the invention, the effect of the temperature on the properties of material is considered, in which the properties of the material includes equivalent specific heat capacity, equivalent thermal resistance and winding resistance. By calculating the instantaneous temperature of the winding in real time and feeding back the temperature to the unit of calculating by the above parameters, the material property parameters at a specific temperature can be obtained, thus improving the simulation accuracy of the winding temperature.

In addition to the objects, features and advantages described above, the invention has other objects, features and advantages, which will be further illustrated in detail below in conjunction with accompanying drawings.

BRIEF DESCRIPTION OF THE DRAWINGS

The accompanying drawings, which constitute a part of the specification and are used for further understanding the invention, show preferred embodiments of the invention and illustrate the principle of the invention together with the specification. In the drawings.

DETAILED DESCRIPTION OF THE INVENTION

The embodiments of the invention are illustrated below in detail in conjunction with the accompanying drawings. However, the invention can be implemented in various ways defined and covered by claims.

Figure 1:
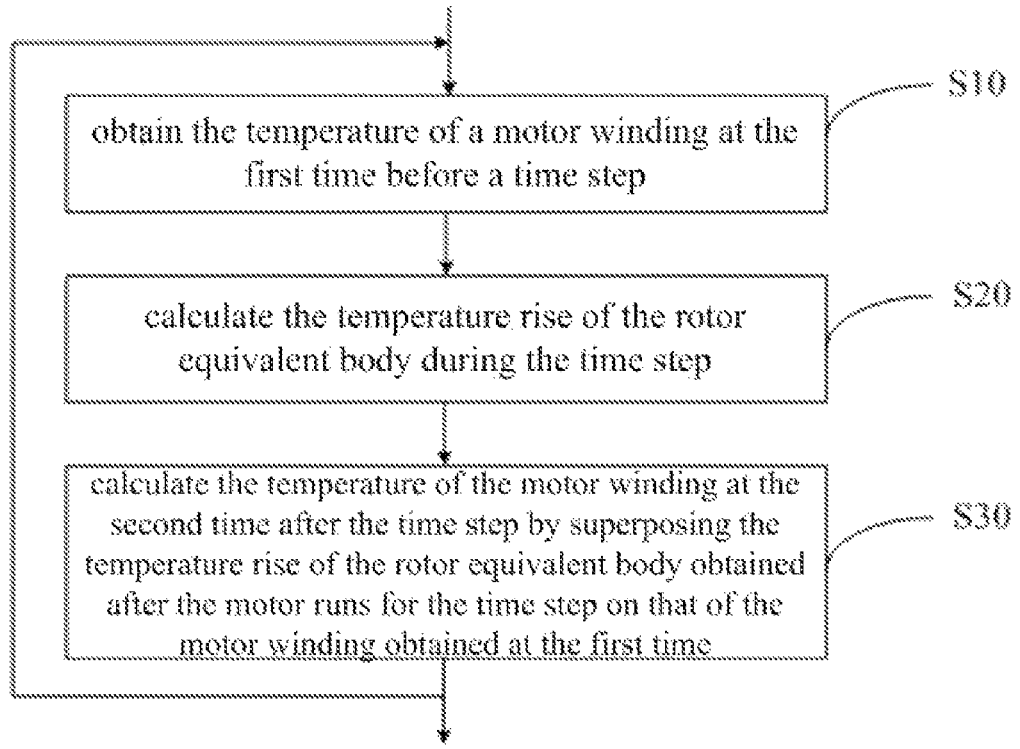
FIG. 1 shows a flow chart of a method for detecting the temperature of a motor winding according to the invention.

FIG. 1 shows a flow chart of a method for detecting the temperature of a motor winding according to the invention.

As shown in FIG. 1, the detecting method of the invention includes the following steps: S10: obtaining motor winding temperature at the first time before the time step; S20: calculating the temperature rise of the rotor equivalent body after running for the time step; and S30: calculating the motor winding temperature at the end of the time step, by superimposing the temperature of the motor winding obtained at the first time before the time step and the temperature rise of the rotor equivalent body obtained after running for the time step.

The way for obtaining the temperature of the motor winding at the first time is related to the running state of the motor, if the motor has just started, the temperature of the motor winding at the first time is the ambient temperature. In this way, after the motor runs for a time step, the temperature of the motor winding at the second is equal to the value obtained by superposing the temperature rise of the rotor equivalent body during the time step on the ambient temperature. If the motor continues running, the temperature of the motor winding at the second time becomes the temperature of the motor winding at the first time before the next time step. If the motor wakes up from sleep, the temperature of the motor winding when sleeping is used as the temperature of the motor winding at the first time.

The step for calculating the temperature rise of the rotor equivalent body is as follows: firstly, obtaining the running parameters of the motor (preferably, the voltage and rotation speed of the motor); calculating the equivalent thermal power and heat dissipation power of the motor; calculating the retained heat during the time step from the equivalent thermal power and the heat dissipation power; and then calculating the temperature rise of the rotor equivalent body from the retained heat and the equivalent specific heat capacity.

Figure 2:
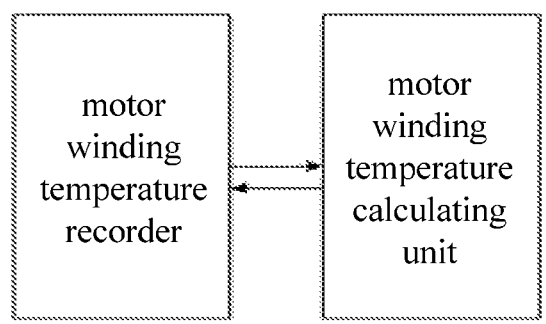
FIG. 2 shows a structure diagram of a device for detecting the temperature of a motor winding according to the invention.

The method for detecting the temperature of the motor winding according to the invention can be implemented by the device for detecting the temperature of the motor winding according to the invention. FIG. 2 shows a structure diagram of the device for detecting the temperature of the motor winding according to the invention. As shown in FIG. 2, the device for detecting the temperature of the motor winding includes: a motor winding temperature recorder configured to obtain the motor winding temperature $T_{i-1}$ at the first time before a time step; a motor winding temperature calculating unit configured to calculate the temperature rise of the rotor equivalent body after running for the time step, and to calculate the temperature of the motor winding at the second time after the time step by superposing the temperature rise on the temperature of the motor winding at the first time before the time step.

Figure 3:
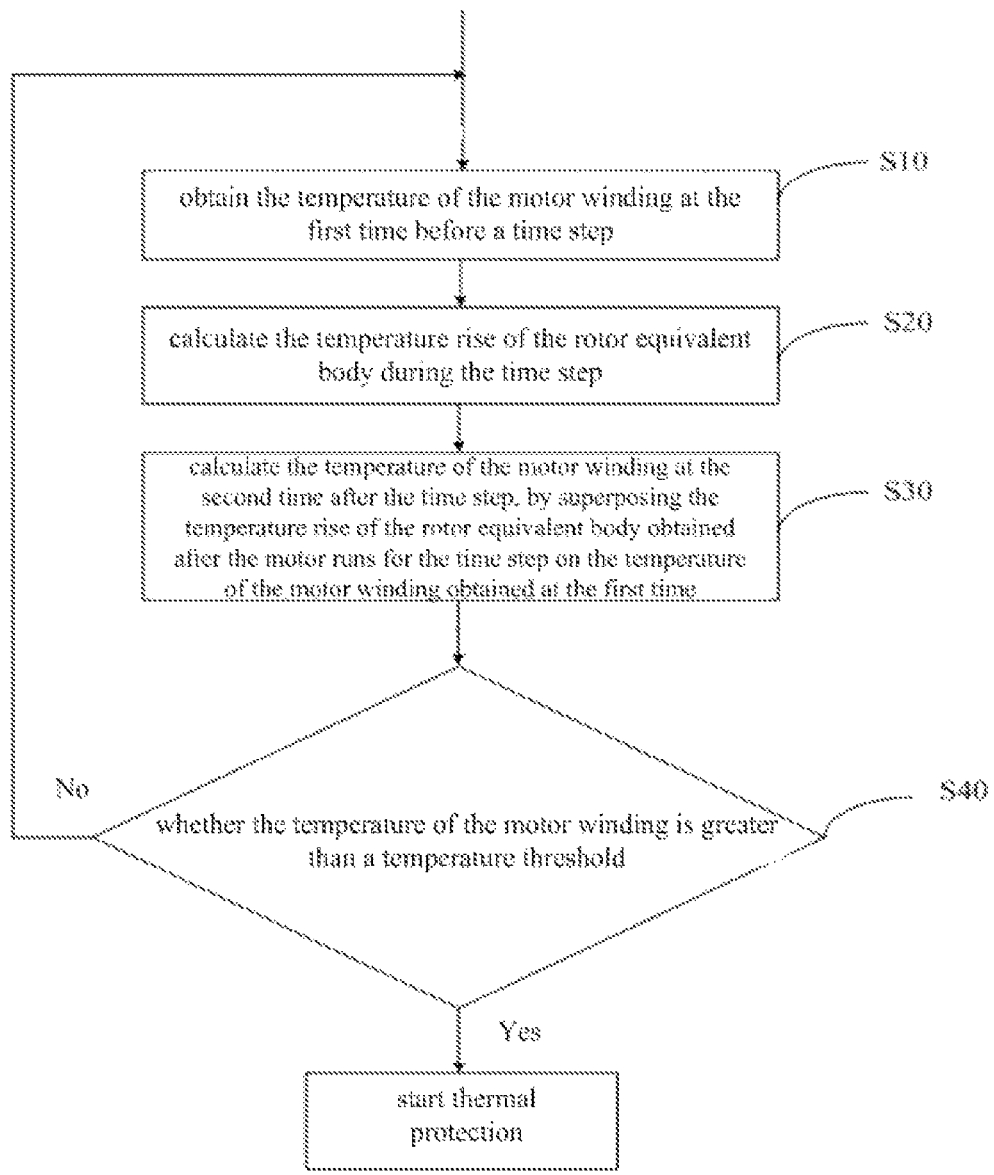
FIG. 3 shows a flow chart of a method for the thermal protection of a motor according to the invention.

FIG. 3 shows a flow diagram of a method for the thermal protection of a motor according to the invention. As shown in FIG. 3, on the basis of the flow chart shown in FIG. 1, a step S40 is added, i.e. comparing the temperature of the motor winding obtained in step S30 with the temperature threshold of the winding, and determining whether to start the thermal protection according to the comparison result. If the temperature of the motor winding is greater than the temperature threshold of the temperature, the thermal protection for the motor is started; otherwise, the motor is allowed to continue working.

Figure 4:
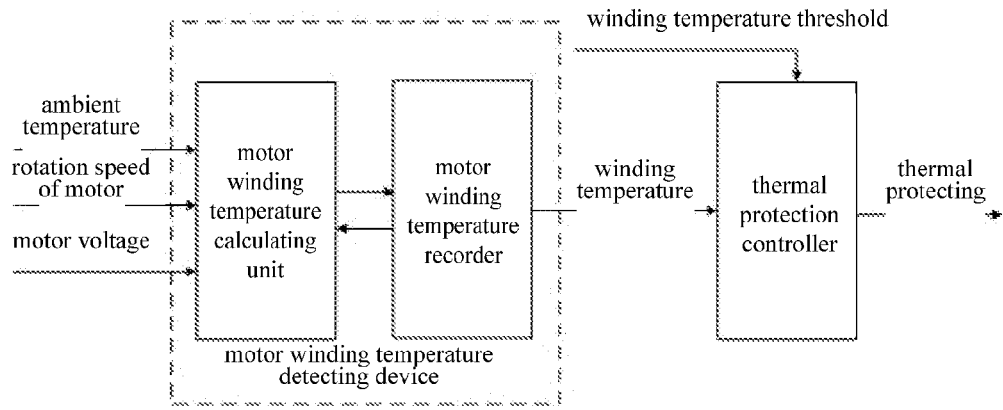
FIG. 4 shows a structure diagram of a device for detecting the temperature of a motor winding according to the invention.

The method for thermal protection of a motor according to the invention can be implemented by the device for thermal protection of a motor winding according to the invention. As shown in FIG. 4, the device for thermal protection of a motor winding includes a device for detecting the temperature of the motor winding according to the invention and a thermal protection controller. Particularly, the thermal protection controller (or referred to as a thermal protection control unit) is configured to compare the temperature of the motor winding provided by the device for detecting the temperature of the motor winding at the current moment with the temperature threshold of the motor winding, and to determine whether to start the thermal protection according to the comparison result. If the temperature of the motor winding is greater than the temperature threshold, the thermal protection for the motor is started; otherwise, the motor is allowed to continue working.

In the invention, preferably, by giving three input conditions: a motor voltage, the rotation speed of the motor and the ambient temperature, the temperature of the motor winding at any moment including the current moment, can be detected by using the calculation unit.

Figure 5:
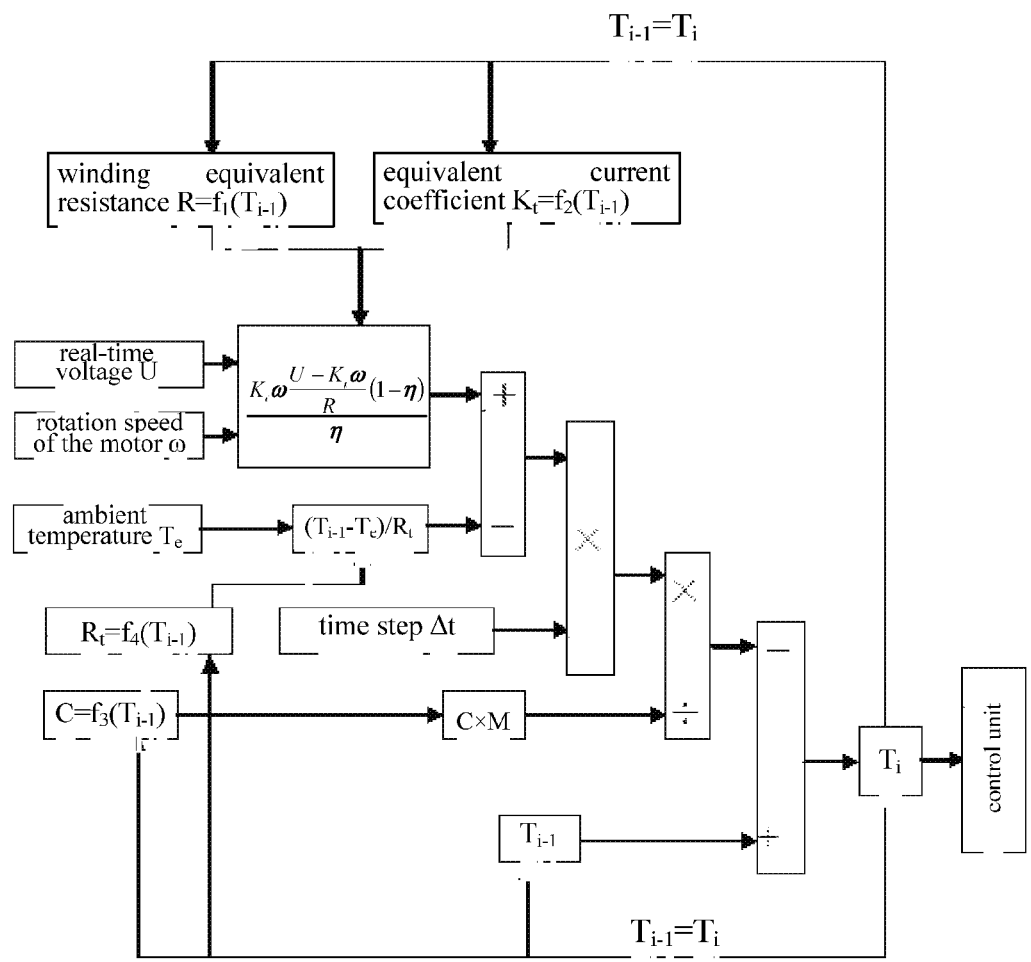
FIG. 5 shows a functional block diagram of the first embodiment of the method for detecting the temperature of the motor winding according to the invention.

First Preferred Embodiment of a Method for Detecting the Temperature of a Motor Winding FIG. 5 shows a principle block diagram of the first preferred embodiment of the method for detecting the temperature of the motor winding according to the invention. As shown in FIG. 5, the equivalent thermal power and heat dissipation power of the motor are firstly calculated based on the detected motor voltage, the rotation speed and the ambient temperature; then the temperature rise of the rotor equivalent body during the time step is calculated by using the equivalent thermal power and the heat dissipation power; and finally, the temperature rise of the rotor equivalent body is superposed on the temperature of the motor winding at the first time before the time step, so as to obtain the temperature of the motor winding at the current moment.

In the invention, the rotor of the motor is observed as a mass equivalent body.

The explanation for the equivalent thermal power of the motor: the motor equivalent thermal power of the invention is the amount of the heat $Q_W$ generated by the motor per unit time, which is calculated from expression (1). Herein it is considered that the electrical energy is only converted into two parts: the mechanical energy output by the motor and the heat energy.

$$Q_W = \frac{K_t \omega \frac{U - K_t \omega}{R}(1-\eta)}{\eta} \quad (1)$$

In the above expression, U is the motor voltage, $K_t$ is the current coefficient, $\omega$ is the rotation speed of the motor, R is the resistance of the winding, and $\eta$ is the mechanical efficiency of the motor, the heat generated by friction and the heat generated by iron loss are reflected by the mechanical efficiency. It is clear that the equivalent thermal power of the motor is calculated from the mechanical efficiency of the motor to improve the detection accuracy of the temperature of the motor winding.

$K_t \omega$ is the back electromotive force, $U-K_t \omega$ is the voltage consumed by the winding, $$\frac{U - K_t \omega}{R}$$

is the current of the winding, and the output torque is obtained by multiplying the current of the winding by the current coefficient $K_t$. The output power is obtained by multiplying the output torque of the motor by the rotation speed $\omega$, and then the equivalent thermal power of the motor can be calculated according to the efficiency of the motor itself.

The explanation for the heat dissipation power of the motor (i.e. equivalent thermal power transferred outwardly from the motor): knowing the equivalent thermal resistance of the motor, the amount of heat $Q_{out}$ transferred outwardly from the motor per unit time can be calculated from expression (2).

$$Q_{out} = \frac{T_{i-1} - T_e}{R_t} \quad (2)$$

In the above expression, $T_{i-1}$ is the temperature of the motor at the previous moment, $T_e$ is the ambient temperature, and $R_t$ is the equivalent thermal resistance of the motor.

The thermal power $Q_W$ and the heat dissipation power $Q_{out}$ generated by the motor are obtained from the above expressions (1) and (2), and the amount of heat retained inside the motor (i.e. in the rotor) per unit time can be calculated by superposing the thermal power $Q_W$ and the heat dissipation power $Q_{out}$. The temperature rise $\Delta T$ of the motor rotor can be calculated according to the retained heat amount, the equivalent specific heat capacity and the mass of the rotor, the expression of which is as follows:

$$\Delta T = \frac{(Q_w - Q_{out})\Delta t}{CM} \quad (3)$$

In the above expression (3), $Q_W$ is the equivalent thermal power of the motor, i.e. the amount of the heat generated in the motor per unit time, $Q_{out}$ is the heat dissipation power of the motor, i.e. the amount of heat dissipated by the motor per unit time, $\Delta t$ is the time step, C is the equivalent specific heat capacity of the rotor, and M is the mass of the rotor.

The specific heat capacity has a great relationship with the nature of the material itself. The reason for introducing the equivalent specific heat capacity of the motor rotor herein is that the rotor is made of different materials, such as copper windings, silicon-steel sheets, and a rigid shaft and these materials have different specific heat capacity. Therefore, the equivalent specific heat capacity of the motor rotor is the weight average of their specific heat capacity. However, the weight average method for calculating the equivalent specific heat capacity of the motor is a theoretical method, and the equivalent specific heat capacity of the motor rotor is obtained by related thermal experiments in fact.

The current coefficient $K_t$, the winding resistance R, the equivalent thermal resistance $R_t$ of the motor and the equivalent specific heat capacity C of the rotor described above are all the functions of the motor winding temperature $T_{i-1}$ at the pervious moment which has a distance of a time step before the current moment, i.e. $R=f_1(T_{i-1})$, $K_t=f_2(T_{i-1})$, $C=f_3(T_{i-1})$, $R_t=f_4(T_{i-1})$. More preferably, the current coefficient $K_t$, the winding resistance R, the equivalent thermal resistance $R_t$ of the motor and the equivalent heat specific capacity C of the rotor described above can all be fit into a linear function of the motor winding temperature $T_{i-1}$, thereby more accurate calculation results can be achieved. It should to be noted that, the linear function of the temperature $T_{i-1}$ of the motor winding with respect to the current coefficient $K_t$, the winding resistance R, the equivalent thermal resistance $R_t$ of the motor and the equivalent specific heat capacity C of the rotor described above is obtained through thermal experiments which is the conventional experimental method mastered by those skilled in the art, and thus the specific experiment methods will not be described in detail. Of course, the relationship between the four parameters and the temperature $T_{i-1}$ of the motor winding can be fit by a higher-order function to achieve the more accurate calculation result.

By substituting the time rise of the rotor equivalent body within the time step and the temperature of the motor winding at the first time into the following expression, the temperature at the current moment can be obtained:

$$T_i = T_{i-1} + \Delta T \quad (4)$$

The above four expressions can be combined into the following two expressions:

$$\begin{cases} Q_w = \dfrac{K_t \omega \dfrac{U - K_t \omega}{R}(1-\eta)}{\eta} \\ T_i = T_{i-1} + \dfrac{\left(Q_w - \dfrac{T_{i-1} - T_e}{R_t}\right)\Delta t}{CM} \end{cases}$$

In use, the above expressions can be modified based on actual conditions.

For the motor used in certain occasions, the motor itself has sensors which can acquire the motor voltage, the rotation speed of the motor and the ambient temperature and also has a control unit capable of processing the three signals. In this way, the temperature of the motor winding can be calculated very easily by using the method according to the invention, and the motor winding temperature under different loads can be tracked. When the calculated simulation temperature of the winding exceeds the temperature threshold, the thermal protection actions will be started to protect the motor.

Figure 6:
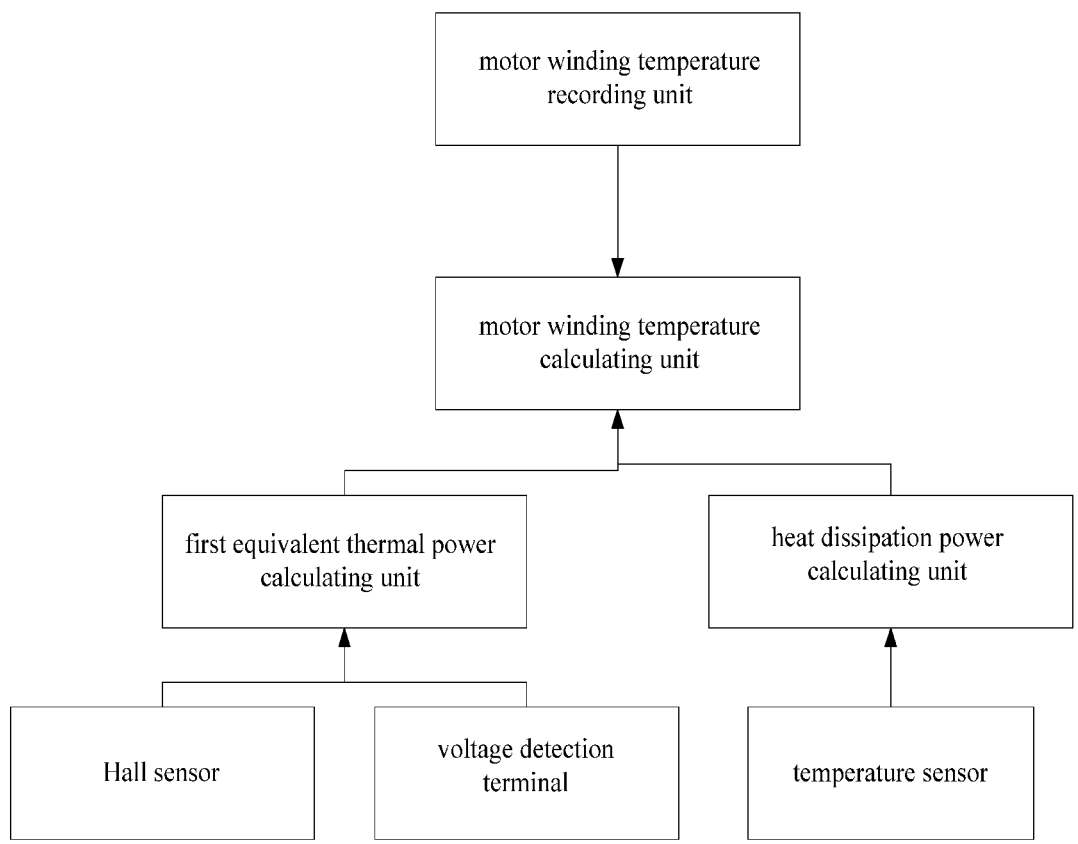
FIG. 6 shows a structure diagram of the first embodiment of the device for detecting the temperature of the motor winding according to the invention.

First Preferred Embodiment of a Device for Detecting the Temperature of a Motor Winding FIG. 6 shows a structure diagram of the first preferred embodiment of the device for detecting the temperature of a motor winding according to the invention. As shown in FIG. 6, the device for detecting the temperature of a motor winding includes the following unit.

A motor winding temperature recording unit is configured to obtain the temperature $T_{i-1}$ of the motor winding at a first time before a time step. Specifically, the motor winding temperature recording unit records the temperature $T_{i-1}$ of the motor winding at the first time. In the case that the motor has just started, the $T_{i-1}$ is equal to the value of the ambient temperature.

The device for detecting the temperature of the motor winding further includes a Hall sensor, a voltage detection terminal and a temperature sensor, where the Hall sensor is carried by the motor itself and is used to acquire the rotation speed $\omega$ of the motor, the voltage detection terminal acquires the motor voltage U during the time step, the temperature sensor acquires the ambient temperature $T_e$.

The device for detecting the temperature of the motor winding further includes a first equivalent thermal power calculation unit configured to calculate the value of the equivalent thermal power $Q_W$ of the motor from expression (1), where R in the expression (1) is the resistance of the winding, $\eta$ is the mechanical efficiency of the motor, $K_t$ is the current coefficient; U and $\omega$ in the expression (1) are provided by the voltage detection terminal and the Hall sensor respectively.

The device for detecting the temperature of the motor winding further includes a heat dissipation power calculation unit configured to calculate the heat dissipation power $Q_{out}$ from expression (2), where $R_t$ in the expression (2) is the equivalent thermal resistance of the motor, $T_e$ is the ambient temperature provided by the temperature sensor.

The device for detecting the temperature of the motor winding further includes a motor winding temperature calculation unit configured to: calculate the temperature rise $\Delta T$ of the rotor equivalent body after the motor runs for the time step $\Delta t$ from the equivalent thermal power $Q_W$ and the heat dissipation power $Q_{out}$ of the motor obtained according to the above way according to the expression (3); calculate, according to the expression (4), the temperature $T_i$ of the motor winding after the motor runs for the time step $\Delta t$; Where C in expression (3) is the equivalent specific heat capacity of the motor rotor, and M is the mass of the motor rotor.

The equivalent specific heat capacity C, the equivalent thermal resistance $R_t$, the winding resistance R and the current coefficient $K_t$ are calculated from $T_{i-1}$, and the above four parameters are input into respective calculation units. If the motor has just started, the ambient temperature value is directly substituted into $T_{i-1}$ for calculation; if the motor wakes up from sleep, the final value calculated in the previous procedure is substituted into $T_{i-1}$ for calculation.

The motor winding temperature calculation unit transmits calculation result to the motor control unit at regular intervals, and the motor control unit compares the calculation result with the temperature threshold. If the calculation result is greater than the temperature threshold, the motor is turned off, otherwise, nothing needs to be done.

Second Preferred Embodiment of a Method for Detecting the Temperature of a Motor Winding The difference between the method of the present embodiment and that of the above embodiment is that the motor equivalent thermal power is calculated from the sum of the copper loss power and the iron loss power.

The copper loss power is calculated as:

$$P_{Cu} = \frac{(U - K_t \omega)^2}{R} \quad (5)$$

Where R is the resistance of the winding, U is the motor voltage, $K_t$ is current coefficient, and $\omega$ is the rotation speed of the motor.

In the iron core, the alternation of the main flux leads to hysteresis and eddy current losses, the basic iron loss $P_{Fe}$ is calculated from the following expression:

$$P_{Fe} = K p_{1/50} B^2 \left(\frac{f}{f_0}\right)^{1.3} G_{Fe} \quad \text{(unit: } W) \quad (6)$$

Where $p_{1/50}$ is the loss per unit of iron core material (W/kg) at the frequency of 50 Hz and the flux density of 1 T, B is the flux density (T) of the iron core, f is alternative frequency (Hz), and $G_{Fe}$ is the mass of the iron core. K is a correction factor when considering the increase of the iron loss caused by the iron core processing, the uneven distribution of magnetic flux density and so on. Therefore, the equivalent thermal power of the motor is: $Q_W = P_{Cu} + P_{Fe}$.

It should be noted that the technical effect of the method for detecting the temperature of a motor winding according to the first preferred embodiment is better than that according to the second preferred embodiment.

Figure 7:
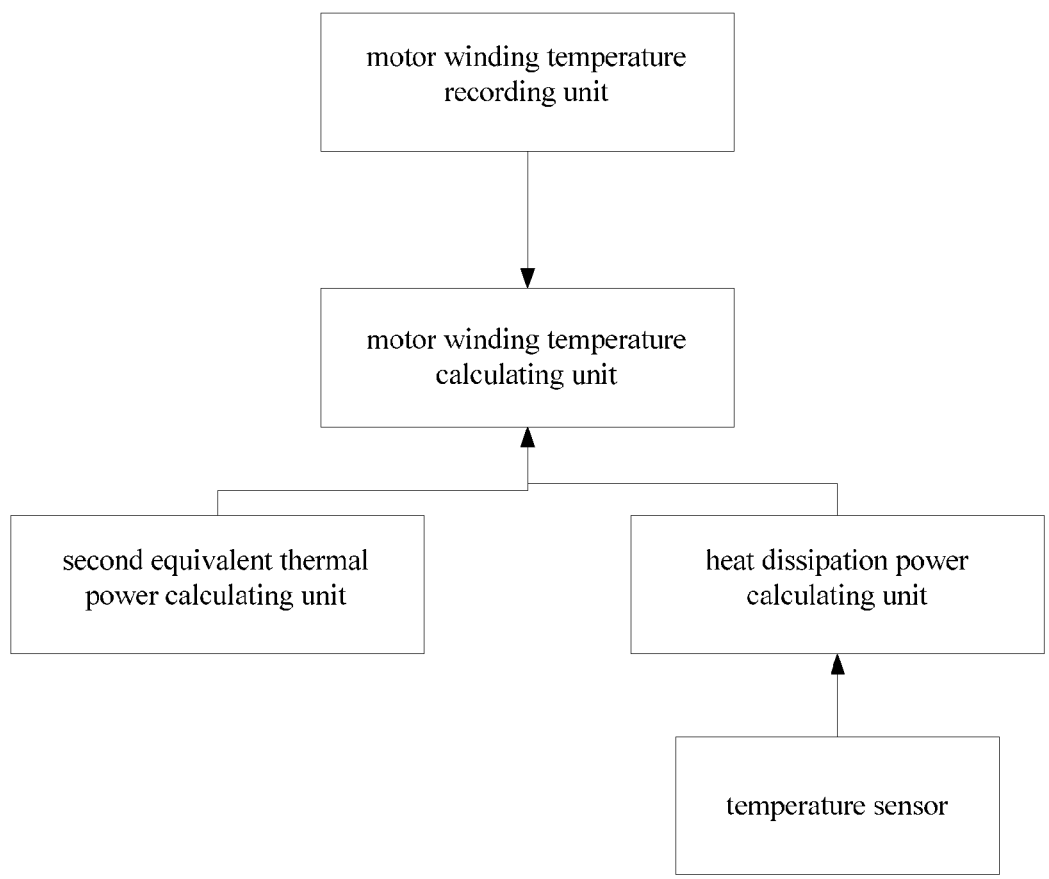
FIG. 7 shows a structure diagram of the second embodiment of the device for detecting the temperature of the motor winding according to the invention.

Second Preferred Embodiment of a Device for Detecting the Temperature of a Motor Winding FIG. 7 shows the structure diagram of the second preferred embodiment of the device for detecting the temperature of a motor winding according to the invention. As shown in FIG. 7, compared with the device of the first preferred embodiment, the device for detecting the temperature of a motor winding according to the second preferred embodiment includes a second equivalent thermal power calculation unit, which replaces the first equivalent heat power calculation unit in the device for detecting the temperature of a motor winding.

The second equivalent thermal power calculation unit is configured to calculate the value of the equivalent thermal power $Q_W$ from the sum of the copper loss power $P_{Cu}$ and the iron loss power $P_{F_e}$; where the copper loss power $P_{Cu}$ is calculated from the expression (5), the iron loss power $P_{F_e}$ is calculated from the expression (6), where R in the expression (5) is the resistance of the winding, U is the motor voltage, $K_t$ is current coefficient, $\omega$ is the rotation speed of the motor; $p_{1/50}$ in expression (6) is the loss per unit of iron core material at the frequency of 50 Hz and the flux density of 1 Tesla, B is the flux density of the iron core, f is alternative frequency, $G_{Fe}$ is the mass of the iron core, K is the correction factor of the iron loss, and $f_0$ is 50 Hz.

The advantages of the invention is that: the heat causing the temperature rise of the motor is detected by a simple method; the equivalent thermal resistance of the motor is introduced, which reflects directly the heat transfer characteristics of the motor itself and reflects the impact of the ambient temperature on the temperature of the winding; and the equivalent specific heat capacity is also introduced, which can reflect the relationship between the ability of the rotor to hold heat and the ability of the motor to dissipate heat.

At the same time, the iterative calculation process of the temperature fully reflects the effect of the temperature rise caused by heat accumulation of the motor rotor equivalent body, the real-time monitoring on the temperature can be achieved by all of these. In addition, the standard for starting the thermal protection is based on the allowable temperature of the winding. For the cold state over-current, thermal state over-current and frequent over-current, the allowable temperature of the winding are also used as the action condition, thus implementing the capability of the motor and improving sensitivity.

The invention also takes into account the effect of temperature on properties of the material, and the properties of the material herein includes equivalent specific heat capacity, equivalent thermal resistance and winding resistance. By calculating the instantaneous temperature of the windings in real time and feeding back the temperature to the calculation unit for the above parameters, the material property parameters at a specific temperature can be obtained, thus improving the simulation accuracy of the winding temperature.

The above described is only preferred embodiments of the invention and is not intended to limit the invention. It is obvious for those skilled in the art that numerous modifications and variations can be made to the invention. Any variations, equivalents and modifications made within the spirits and principles of the invention should fall within the scope of protection of the invention.

What is claimed is:

1. A method for thermally protecting a motor based on determining a simulated temperature of a winding of the motor, comprising the following steps:

A) obtaining the temperature $T_{i-1}$ of the winding at a first time before a time step $\Delta t$;

B) detecting the voltage U and the rotation speed $\omega$ of the motor during the time step, acquiring the equivalent thermal power $Q_W$ and the heat dissipation power $Q_{out}$ of the motor; and calculating, by using a first expression, the temperature rise $\Delta T$ of the rotor equivalent body after the motor runs for the time step $\Delta t$, wherein the first expression is:

$$\Delta T = \frac{(Q_w - Q_{out})\Delta t}{CM},$$

wherein C is the equivalent specific heat capacity of the motor rotor, M is the mass of the motor rotor;

the equivalent thermal power $Q_W$ of the motor is calculated from the voltage U and the rotation speed $\omega$ of the motor from expression $$Q_w = \frac{K_t \omega \frac{U - K_t \omega}{R}(1-\eta)}{\eta},$$

wherein R is the resistance of the winding, $\eta$ is the mechanical efficiency of the motor, and $K_t$ is a current coefficient;

C) calculating, by using a second expression, a simulated temperature $T_i$ of the winding after the motor runs for the time step $\Delta t$; wherein the second expression is: $T_i = T_{i-1} + \Delta T$; and D) comparing the simulated temperature $T_i$ with a temperature threshold, and starting thermal protection for the motor if the simulated temperature $T_i$ is greater than the temperature threshold.

2. The method according to claim 1, wherein in the step B, the equivalent thermal power $Q_W$ of the motor is equal to the sum of copper loss power $T_{Cu}$ and iron loss power $P_{F_e}$, wherein the copper loss power $P_{Cu}$ is calculated from a fourth expression, and the iron loss power $P_{F_e}$ is calculated from a fifth expression, and wherein the fourth expression is:

$$P_{Cu} = \frac{(U - K_t\omega)^2}{R},$$

wherein R is the resistance of the winding, U is a motor voltage, $K_t$ is a current coefficient, and $\omega$ is a rotation speed of the motor;

the fifth expression is:

$$P_{F_e} = K p_{1/50} B^2 \left(\frac{f}{f_0}\right)^{1.3} G_{Fe},$$

wherein $p_{1/50}$ is a loss per unit of the iron core material at the frequency of 50 Hz and the flux density of 1 Tesla, B is the flux density of the iron core, f is an alternative frequency, $G_{Fe}$ is the mass of the iron core, K is a correction factor of the iron loss, and $f_0$ is 50 Hz.

3. The method according to claim 1, wherein the step B further comprises detecting the ambient temperature $T_e$, wherein the heat dissipation power $Q_{out}$ of the motor is calculated from a sixth expression, wherein the sixth expression is:

$$Q_{out} = \frac{T_{i-1} - T_e}{R_t},$$

wherein $R_t$ is the equivalent thermal resistance of the motor.

4. The method according to claim 1, wherein in the step B, the equivalent specific heat capacity C of the motor rotor is fit into a linear function of the temperature $T_{i-1}$ of the winding, and in the time step, the value of the equivalent specific heat capacity C obtained from the linear function is substituted into the first expression for performing the calculation.

5. A device for thermally protecting a motor based on determining a simulated temperature of a winding of the motor, comprising:

a motor winding temperature recording unit configured to obtain a temperature $T_{i-1}$ of the winding at a first time before a time step $\Delta t$;

a motor winding temperature calculating unit configured to detect the voltage U and the rotation speed $\omega$ of the motor during the time step, calculate, by using a first expression, the temperature rise $\Delta T$ of the rotor equivalent body after the motor runs for the time step $\Delta t$ from a acquired equivalent thermal power $Q_W$ and a acquired heat dissipation power $Q_{out}$ of the motor; and calculate, by using a second expression, a simulated temperature $T_i$ of the winding after the motor runs for the time step $\Delta t$; and a controller for starting thermal protection of the motor when the simulated temperature $T_i$ exceeds a temperature threshold, wherein the first expression is:

$$\Delta T = \frac{(Q_w - Q_{out})\Delta t}{CM},$$

wherein C is the equivalent specific heat capacity of the motor rotor, M is the mass of the motor rotor;

the second expression is: $T_i = T_{i-1} + \Delta T$, and wherein the equivalent thermal power $Q_W$ of the motor is calculated from the voltage U and the rotation speed $\omega$ of the motor from expression $$Q_w = \frac{K_t \omega \frac{U - K_t \omega}{R}(1 - \eta)}{\eta},$$

wherein R is the resistance of the winding, $\eta$ is the mechanical efficiency of the motor, and $K_t$ is a current coefficient.

6. The device according to claim 5, further comprising a second equivalent thermal power calculation unit configured to calculate the value of the equivalent thermal power $Q_W$ from the sum of the copper loss power $P_{Cu}$ and the iron loss power $P_{Fe}$, wherein the copper loss power $P_{Cu}$ is calculated from a fourth expression, and the iron loss power $P_{Fe}$ is calculated from a fifth expression, and wherein the fourth expression is $$P_{Cu} = \frac{(U - K_t \omega)^2}{R},$$

wherein R is the resistance of the winding, U is the motor voltage, $K_t$ is a current coefficient, $\omega$ is the rotation speed of the motor;

the fifth expression is $$P_{Fe} = K p_{1/50} B^2 \left(\frac{f}{f_0}\right)^{1.3} G_{Fe},$$

wherein $p_{1/50}$ is the loss per unit of iron core material at the frequency of 50 Hz and the flux density of 1 Tesla, B is the flux density of the iron core, f is alternative frequency, $G_{Fe}$ is the mass of the iron core, K is a correction factor of the iron loss, and $f_0$ is 50 Hz.

7. The device according to claim 5, further comprising a temperature sensor and a heat dissipation power calculating unit, wherein the temperature sensor is configured to acquire the ambient temperature $T_e$;

the heat dissipation power calculating unit is configured to obtain the heat dissipation power $Q_{out}$ from a sixth expression, wherein the sixth expression is:

$$Q_{out} = \frac{T_{i-1} - T_e}{R_t},$$

wherein $R_t$ is the equivalent thermal resistance of the motor.

* * * * *